United States Patent
Yatake

(10) Patent No.: US 6,670,409 B2
(45) Date of Patent: Dec. 30, 2003

(54) INK JET RECORDING INK SET, RECORDING METHOD AND RECORDING APPARATUS THEREFOR, AND RECORDING IMAGE MADE THEREBY

(75) Inventor: Masahiro Yatake, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 09/836,435

(22) Filed: Apr. 17, 2001

(65) Prior Publication Data

US 2002/0038613 A1 Apr. 4, 2002

(30) Foreign Application Priority Data

Apr. 15, 2000 (JP) ........................................ 2000-116787
Apr. 5, 2001 (JP) ........................................ 2001-106996

(51) Int. Cl.⁷ ........................ C09D 11/10; C09D 11/02; B41J 2/01
(52) U.S. Cl. ........................ 523/160; 106/31.6; 347/37; 347/100
(58) Field of Search ................................ 523/160, 161; 106/31.27, 31.28, 31.6; 347/37, 100

(56) References Cited

U.S. PATENT DOCUMENTS

| | | | | | |
|---|---|---|---|---|---|
| 5,889,083 | A | * | 3/1999 | Zhu | 523/161 |
| 5,900,899 | A | | 5/1999 | Ichizawa et al. | 347/100 |
| 5,985,015 | A | * | 11/1999 | Kanaya | 106/31.6 |
| 5,993,524 | A | * | 11/1999 | Nagai et al. | 106/31.27 |
| 6,007,182 | A | * | 12/1999 | Matsubara et al. | 347/43 |
| 6,075,069 | A | * | 6/2000 | Takemoto | 523/160 |
| 6,113,679 | A | * | 9/2000 | Adkins et al. | 106/31.6 |
| 6,183,071 | B1 | * | 2/2001 | Sugimoto et al. | 347/85 |
| 6,260,938 | B1 | * | 7/2001 | Ohtsuka | 347/15 |
| 6,299,675 | B1 | * | 10/2001 | Ono et al. | 106/31.27 |
| 6,416,150 | B1 | * | 7/2002 | Kimura | 347/14 |
| 6,440,203 | B2 | * | 8/2002 | Kato | 106/31.6 |
| 2003/0008938 | A1 | * | 1/2003 | Sano et al. | 523/160 |

FOREIGN PATENT DOCUMENTS

| | | |
|---|---|---|
| EP | 1045013 A1 * | 10/2000 |
| JP | 418462 | 1/1992 |

OTHER PUBLICATIONS

Patent Abstracts of Japan Publication No. 04018462A dated Jan. 22, 1992.

* cited by examiner

*Primary Examiner*—Callie Shosho
(74) *Attorney, Agent, or Firm*—Ladas & Parry

(57) ABSTRACT

Disclosed is an ink jet recording ink set having light color inks of a plurality of colors and dark color inks of a plurality of colors. Each of the light color inks has at least a pigment, a solvent and a fine polymer particle and each of the dark color inks having at least a pigment and a solvent. Furthermore, each of the dark color inks either do not contain a fine polymer particle or contain a fine polymer particle in smaller quantity than the light color inks.

36 Claims, No Drawings

INK JET RECORDING INK SET, RECORDING METHOD AND RECORDING APPARATUS THEREFOR, AND RECORDING IMAGE MADE THEREBY

BACKGROUND OF THE INVENTION

1. Field of the Invention

This invention relates to an ink set for use with ink jet recording, and more particularly to an ink set for use with ink jet recording, ink jet recording method, and recording apparatus that are capable of forming a text and/or an image exhibiting excellent color production and smear resistance, whether using an ordinary paper or a special ink jet recording paper, and to a recording image made thereby.

2. Description of the Related Art

With the revolutionary advances being made in ink jet recording technology in recent years, it has become possible to output a full-color image comparable to a photograph, and a color ink jet recording apparatus has come to dominate the consumer market for the recording apparatus. In general, an ink set having at least four colors, namely black, yellow, magenta, and cyan, is loaded into the color ink jet recording apparatus, with most of the inks in these ink sets being a dye ink. A pigment ink is superior to the dye inks in terms of printed image fastness, that is, light resistance, gas resistance, and water resistance, and there exists a demand for the ink set that takes full advantage of those properties. Ink set has recently come on the market, which employs a pigment (carbon black) only for the black ink and uses dyes in the color inks, but no color pigment ink sets comprising all pigment inks have been marketed to date, which are capable of forming the text and/or image which excel in color production and smear resistance.

The recording media used in ink jet recording technology include the ordinary paper, typified by a PPC paper (and in the present invention means paper in which no particular consideration has been taken into ink jet recording properties), and a special ink jet recording paper (hereinafter referred to merely as "special paper") wherein an ink receiving layer is provided on a substrate comprising a high-quality paper or the like.

In general, there is a long-felt demand for the formation of the text and/or images exhibiting excellent color production and smear resistance on recording media such as the ordinary paper and the special paper. The ordinary paper is superior to the special paper in terms of shear resistance, but inferior in terms of color production. For this reason, for such a ordinary paper, the ink has been required to have large amounts of the pigment added, while needing only small amounts of additives such as a fine polymer particle to enhance smear resistance. The special paper, on the other hand, while superior to the ordinary paper in terms of color production, is inferior in terms of smear resistance. For the special paper, therefore, the ink has been required to have large amounts of additive for enhancing smear resistance, while needing only small amounts of the pigment added. Japanese Patent Application Laid-Open No. H4-18462/1992 discloses, for example, an ink which is suitable for use with the ordinary paper, and which is made to contain a microemulsion wherein the smear resistance enhancer (fine polymer particle) is made a dispersion. With this ink, however, the text and/or image having adequate smear resistance in practice could not be formed on the special paper.

For an ink jet recording system capable of forming the text and/or image showing excellent color production and smear resistance on either the ordinary paper or the special paper, one is conceivable that has one ink set configured only from inks suitable for the ordinary paper, and another ink jet configured only from inks suitable for the special paper, wherewith the ink set is changed according to the recording media to be recorded. Given the troublesomeness of having to change the ink set, however, such a system is not fully practicable.

SUMMARY OF THE INVENTION

An object of the present invention is to provide an ink jet recording ink set, together with an ink jet recording method and a recording apparatus therefor, capable of forming a text and/or an image having excellent color production and smear resistance, using either the ordinary paper or the special paper, with the same system (that is, a system that does not require the operation of changing the ink act to match the recording media to be used), thus broadening the range of recording media that can be selected, as well as a recording image made therewith.

The above object is attained with an ink jet recording ink set comprising: light color inks of a plurality of colors, each of the light color inks having at least a pigment, a solvent and a fine polymer particle; and dark color inks of a plurality of colors, each of the dark color inks having at least a pigment and a solvent, wherein said each of the dark color inks either do not contain a fine polymer particle or contain a fine polymer particle in smaller quantity than said light color inks, and the ink jet recording method and the recording apparatus that use the above ink set, together with the recording image made therewith.

According to the ink jet recording ink set of the present invention, the text and/or the images showing excellent color production and smear resistance can be formed therewith, with the same system, whether using the ordinary paper or the special ink jet recording paper as the recording media.

According to the ink jet recording ink set of the present invention, moreover, the viscosity and solid part density of each of the inks of different colors can be adjusted so that they become almost identical between the inks of different colors, thereby making it easy to effect discharge control in terms of frequency dependence and discharge volume dependence, etc., in ink discharges of different inks.

DESCRIPTION OF THE PREFERRED EMBODIMENTS

A detailed description is now given of the ink jet recording ink set of the present invention.

The ink jet recording ink set of the present invention, as described above, has light color inks of a plurality of colors and dark color inks of a plurality of colors.

By "light color ink" is herein meant an ink of light color, and, when there are inks of two colors having the same hue but the different color density in the ink set, refers to the ink of lighter color. These light color inks form the text and/or the image exhibiting excellent color production, and are capable of producing a brilliant print, particularly on the special paper.

By "dark color ink," on the other hand, is herein meant an ink of dark color, and, when there are inks of two colors having the same hue but the different color density in the ink set, refers to the ink of darker color. These dark color inks are inks that form the the text and/or the image having excellent color production and are capable of producing a dark print, on the ordinary paper as well as on the special paper.

By "ordinary paper" is herein meant, moreover, a paper wherein no particular consideration has been taken into ink jet recording properties, typified by the PPC paper. By "special paper" is herein meant a recording media for ink jet recording wherein an ink receiving layer is provided on a substrate comprising a high-quality paper or the like. These special papers include so-called "swelling type paper" that has a water-soluble resin such as a polyvinyl alcohol contained in the ink receiving layer, and "absorbing type paper" that has a porous material such as an amorphous silica contained in the ink receiving layer.

A favorable combination of the light color inks of a plurality of colors and dark color inks of a plurality of colors according to the ink jet recording ink sets of the present invention is described below.

When making an ink jet recording ink set having inks of 6 colors, the light color inks of the plurality of colors include light cyan, light magenta, and yellow inks, while the dark color inks of the plurality of colors include black, cyan, and magenta inks.

When printing using this ink jet, the three colors of dark color inks and the yellow ink are mainly used for the ordinary paper. For the special paper, however, the three colors of light color inks are mainly used, and for the black color a composite black made from the three colors of the light color inks is used. The term "mainly used" will be described below for specific aspects.

When the ink jet recording ink set is made to have 7 colors, the light color inks of the plurality of colors include light cyan, light magenta, and yellow inks, while the dark color inks of the plurality of colors include black, cyan, magenta, and dark yellow inks.

When this ink set is used in printing for the ordinary paper, the four colors of the dark color inks are mainly used, while, for the special paper, the three colors of the light color inks are mainly used, with a composite black made from he three colors of the light color inks used for the black color.

Similarly, when the ink jet recording ink set is made to have 7 colors, the light color inks of the plurality of colors include light black, light cyan, light magenta, and yellow inks, while the dark color inks of the plurality of colors include black, cyan, and magenta inks.

When this ink set is used in printing for the ordinary paper, the three colors of the dark color inks and the yellow ink are mainly used, whereas, for the special paper, the four colors of the light color inks are mainly used.

When the ink jet recording ink set is made to have 8 colors, the light color inks of the plurality of colors include light black ink, light cyan ink, light magenta ink, and yellow ink (or light yellow ink), while the dark color inks of the plurality of colors are black ink, cyan inks, magenta ink, and dark yellow ink (or yellow ink).

When this ink set is used in printing for the ordinary paper, the four colors of the dark color inks are mainly used, whereas, for the special paper, the four colors of the light color inks are mainly used.

Among these ink jet recording ink sets, the ink jet recording ink set having the 8 colors of inks is preferable because the text and/or the image exhibiting particularly excellent color production are formed therewith, but the ink sets may be selected appropriately according to printing cost and the ink jet recording apparatus wherein it is to be loaded, etc.

In the light color inks of the plurality of colors and dark color inks of the plurality of colors according to the present invention, each containing at least a pigment and a solvent. Each of light color inks also contains a fine polymer particle, but each of the dark-color inks either does not contain the fine polymer particle or contains the fine polymer particle in smaller quantities than the light color inks. What is meant herein by "each of the dark color inks contains the fine polymer particle in smaller quantities than the light color inks" is that the quantity of the fine polymer particle contained in the ink of the light color inks of the plurality of colors containing the smallest quantity of the fine polymer particles is greater than the quantity of the fine polymer particle contained in the ink of the dark color inks of the plurality of colors containing the largest quantity of the fine polymer particle.

As mentioned above, the quantity of the fine polymer particle contained in the light color inks is different from that contained in the dark color inks. More specifically, the light color inks contains 0.5 to 10 wt % of the fine polymer particle, preferably 2.5 to 8 wt % thereof, while the dark color inks contain 0 to 5 wt % of the fine polymer particle, preferably 0.5 to 3 wt % thereof. If the amount of the fine polymer particle contained in the light color ink exceeds 5 wt %, clogging readily occurs, particularly in nozzle heads that employ electrostrictive devices due to an increase in the solid portion. When the quantity of the fine polymer particle contained in the dark color ink is less than 0.5 wt %, there is little effectiveness in improving smear resistance, and no improvement in smear resistance is almost observed even though a content of the fine particle exceeds 10 wt %.

In addition, an ink jet recording ink set can be provided that is capable of forming the text and/or the image on the ordinary paper or the special paper, with the same system, even when the following relationship holds between the light color inks and the dark color inks. That is, when the ink jot recording ink set of the present invention comprises light color inks of a plurality of colors and dark color inks of a plurality of colors having the same hues as in the colors of the light color inks, the light color inks contain the pigment, fine polymer particle and solvents, the dark color inks contain the pigment and the solvent, or, alternatively, the pigment, the fine polymer particle, and solvents, the solid material weight percent in the various colors of ink in the light color inks when the pigment and fine polymer particle are made solid materials is represented as X %, and the solid material weight percentage of the dark color inks of the same hues as the colors of the light color inks is represented as Y %, the relationship $$0.8 \cdot X \leq Y \leq 1.2 \cdot X \qquad (1)$$

holds. Preferably, the relationship between X and Y may be such that $0.85 \cdot X \leq Y \leq 1.15 \cdot X$, and more preferably such that $0.9 \cdot X \leq Y \leq 1.1 \cdot X$. Outside the range of the formula (1) relationship, it becomes more difficult to snatch the viscosities of inks between the light colors and dark colors of the same color, both ink recording quality and discharge stability are adversely affected, and practical levels can not be reached.

In a combination of ink jet recording ink sets having the relationship noted above, the light color inks of the plurality of colors include light black, light cyan, light magenta, and light yellow inks, while the dark color inks of the plurality of colors include black, cyan, magenta, and yellow inks.

For the polymer constituting the fine polymer particle mentioned in the foregoing, one is desirable that is water-insoluble or very slightly water-soluble, capable of enhancing the fixation of the pigment ink onto the recording media, particularly onto the special paper, and capable of forming the test and/or the image showing excellent smear resistance onto the special paper.

Examples of such polymers include a polymer selected from the group consisting of acrylate-base, methacrylate-based, styrene-based, urethane-based, acrylamide-based, epoxide-based polymers. These polymer may be used alone or in combination thereof. More specifically, use may be made of styrene, tetrahydrofurfuryl acrylate, butyl methacrylate, (α-2, 3, or 4)-alkyl styrenes, (α-2, 3, or 4)-alkoxystyrenes, 3,4-dimethylstyrene, α-phenylstyrene, divinylbenzene, vinylinaphthaline, dimethylamino(meth)acrylate, dimethylaminoethyl(meth)acrylate, dimethylaminopropyl acrylamide, N,N dimethylaminoethyl acrylate, acryloylmorpholine, N,N-dimethyl acrylamide, N-isopropyl acrylamide, N,N-diethyl acrylamide, methyl (meth)acrylate, ethyl (meth)acrylate, propyl (meth)acrylate, ethylhexyl (meth)acrylate, and other alkyl (meth)acrylates, methoxydiethylene glycol (meth)acrylate, diethyleneglycols having an ethoxy, propoxy, or groups, polyethyleneglycol (meth) acrylate, cyclohexyl (meth)acrylate, benzyl (meth)acrylate, phenoxyethyl (meth)acrylate, isobonyl (meth)acrylate, hydroxyalkyl (meth)acrylate, and other fluorine-containing, chlorine-containing, or silicon-containing (meth)acrylates, (meth)acrylamides, and maleic acid amides. When a crosslinked structure besides a mono-functional structure such as (meth)acrylic acid is introduced, examples used in the present invention include (meth)acrylates such as (mono, di, tri, tetra, poly)ethyleneglycol di(meth)acrylates, 1,4-butanediol, 1,5-pentanediol, 1,6-hexanediol, 1,8-octanediol, and 1,10-decanediol, and the other (meth)acrylate, trimethylolpropane tri(meth)acrylate, glycerin (di, tri) (meth)acrylates, di(meth)acrylate of ethyleneoxide adducts of bisphenol A or F, neopentylglycol di(meth)acrylate, pentaerythritol tetra(meth)acrylate, and dipentaerythritol hexa (meth)acrylate or the like.

In terms of dispersion stability of the inks, the fine polymer particle as noted above may have a mean particle size of from 50 to 250 nm, preferably from 60 to 120 nm.

The above fine polymer particle having either a single phase structure or multi phase structure (core-shell type) can be used, but, in terms of dispersion stability of the inks, the core-shell type is particularly desirable.

In terms of film formability at room temperature and ink stability, the glass transition temperature (Tg) of the fine polymer particle is preferably between −10 and 25° C., more preferably between −5 and 15° C.

Tg is measured according to JIS K 6900.

The fine polymer particle noted in the foregoing is mixed into the inks of the present intention in emulsion form. By "emulsion" is herein meant a water-based dispersion liquid the fine polymer particle, where the dispersion medium is water and the dispersing material is formed of the fine polymer particle.

It is preferred that in terms of film formability at room temperature, this emulsion exhibits a minimum film formation temperature (MFT) of 20° C. or lower, more preferably from −5 to 10° C. For the method of making the MFT of the emulsion within the range noted above, in addition to the method of making the Tg of the fine polymer particle within the ranges noted above, a method wherein a commercially available MFT depressing agent is used may be adopted.

MFT is measured according to JIS K 6800.

It is preferable that the emulsion be anionic, in terms of the dispersion stability of self dispersing pigments (described below). From the same point of view, when a pigment having a cationic surface (such as one dispersed with a cation group by a surface treatment, for example) is used, it is preferable that that emulsion be cationic.

For example, the emulsion is made as follows.

One Method for Making Emulsion

Into a reaction vessel equipped with a dropping apparatus, a thermometer, cold-water reflux condenser, and a mixer, 100 parts of an ion exchange water are introduced and, while stirring at a temperature of 70° C. under a nitrogen atmosphere, 0.2 part of an initiator is then added. This is caused to undergo a polymerization reaction by adding a separately prepared monomer solution. Thus the primary substance is prepared. Then, at a temperature of 70° C., to this primary substance is added 2 parts of a 10% aqueous solution of the initiator, while stirring, and then a separately prepared reaction liquid is added and a polymerization reaction is induced, while stirring, to yield a polymerization reaction product. That polymerization reaction product is neutralized with a neutralizing agent and adjusted to a pH of 8 to 0.5, then filtered with a 0.3 μm filter to remove the coarse particles, thus yielding the emulsion having the fine polymer particle described earlier as the dispersing material.

For the initiator noted above, one like that used in ordinary radical polymerization may be employed, examples thereof include potassium persulfate, ammonium persulfate, hydrogen persulfate, azobisisobutyronitrile, benzoyl peroxide, dibutyl peroxide, peracetic acid, cumene hydroperoxide, t-butyl hydroxyperoxide, and paramonthane hydroxyperoxide or the like. In particular, as noted earlier, when the polymerization reaction is done in water, a water-soluble polymerization starter is preferable.

Examples of the emulsifier used in the polymerization reaction described above include, in addition to sodium lauryl sulfate and potassium lauryl sulfate, a substance that is generally used as an anionic surfactant, a non-ionic surfactant, and an amphoteric surfactant or the like.

Examples of a chain transfer agent that can be used in the polymerization reaction described above include t-dodecyl mercaptan, n-dodecyl mercaptan, n-octyl mercaptan, xanthogens such as dimethylxanthogen disulfide, diisobutylxanthogen disulfide, dipentene, indene, 1,4-cyclohexadiene, dihydrofurane, and xanthene or the like.

For the pigments used in the present invention, the same as those in this type of ink are used. Examples of such organic pigments include azo lake, a insoluble azo pigment, a condensed azo pigment, a chelate azo pigment, a phthalocyanine pigment, a perylene pigment, a perinone pigment, a quinacridone pigment, a thioindigo pigment, an isoindolynone pigment, a quinofuralone pigment, a dioxazine pigment, an anthraquinone pigment, an nitro pigment, an nitroso pigment, and aniline black, and an inorganic pigment such as titanium white, zinc white, lead white, carbon blacks, red iron oxide, vermilion, cadmium red, chrome yellow, ultramarine blue, cobalt blue, cobalt violet, and selsyn blue or the like. Even pigments which are not noted in the color index can be used if they are dispersable in a water phase. Of these, the use of azo lake, the insoluble azo pigment, the condensed azo pigment, the chelate azo pigment, the phthalocyanine pigment, the perylene pigment, the perinone pigment, the quinacridone pigment, the thioindigo pigment, the isoindolynone pigment, the quinofuralone pigment, the dioxazine pigment, the anthraquinone pigment and carbon blacks is particularly desirable. By "pigment," moreover, is herein meant a granular solid that is insoluble in water, other solvents, oil or the like.

In terms of enhancing the dispersion stability of the pigments in the inks, it is preferable that the pigments noted above be either a self-dispersing pigment of a dispersant-dispersing pigment.

By "self dispersing pigment" is herein meant a pigment that can disperse uniformly in an aqueous ink even without the admixture of a separate dispersant, being such as have in the surface thereof one or more functional groups (dispersability imparting groups) selected from the group consisting of a carboxyl group, a carbonyl group, a hydroxyl group, and a sulfonic acid group. An ink wherein such self-dispersing pigment is mixed exhibits high dispersion stability, compared to an ordinary ink wherein the non-self-dispersing pigment and the dispersant are mixed, and produce the ink of suitable viscosity, so that it becomes possible to cause more pigment to be contained, and text and/or the image exhibiting excellent color production can be formed, particularly on the ordinary paper. With the ink wherein such self-dispersing pigments are mixed, furthermore, there is no decline in fluidity when a penetrating agent (described below) effective in enhancing record quality is mixed in, whereby print quality can also be improved by using such a penetrating agent.

For example, the self-dispersing pigment described above is prepared as follows.

One Method for Preparing Self-Dispersing Pigments (Pigment Surface Oxidation Treatment)

The pigment is added to a solvent, and this is either dispersed by high-speed shearing with a high-speed mixer or the like, or impact dispersed with a bead mill or jet mill or the like to produce a slurry form of the pigment dispersion liquid. While gently stirring such pigment dispersion liquid, a treating agent containing sulfur (such as sulfamic acid, fuming sulfuric acid, chlorosulfuric acid, fluorosulfuric acid, or amide sulfuric acid) is added thereto, the pigment dispersion liquid is thermally treated at 60 to 200° C., and a dispersability-imparting group is introduced into the pigment surface. After removing the solvent from this pigment dispersion liquid, water washing, ultrafiltration, reverse osmosis, centrifuging, and filtration and the like are repeatedly performed and the treating agent containing sulfur is removed, whereupon the self-dispersing pigment is obtained.

By "dispersant dispersing pigment" is meant a pigment that can be uniformly dispersed in an aqueous ink by means of a dispersant (either a dispersant of high molecular weight such as a styrene-acrylic acid dispersant, or a surfactant type dispersant). Examples of such dispersants include Johncryl dispersants (made by Johnson Polymer) and Hiranol dispersants (made by Daiichi Kogyo Seiyaku Co., Ltd.), with the styrene-acrylic acid type dispersants of high molecular weight being particularly preferred.

In terms of enhancing ink storage stability and preventing nozzle clogging, the mean particle size of the pigment is preferably between 50 and 150 nm, more preferably between 60 and 120 nm.

The pigment may be contained in the light color inks in a quantity of from 0.01 to 10 wt %, preferably from 0.1 to 5 wt %, and in the dark color inks in a quantity of from 1 to 20 wt %, preferably from 3 to 8 wt %. In terms of making relatively dark printing possible on the ordinary paper, in the dark color inks, as necessary, more pigment can be mixed according to an extent that the quantity of fine polymer particles is made less.

When the quantity of the pigment contained in the light color inks is less than 0.01 wt %, the density of printed text or image is inadequate on the special paper, not to mention on the ordinary paper. When that quantity exceeds 10 wt %, on the other hand, the ink ceases to be light color ink. When the quantity of the pigment contained in the dark color inks is less than 1 wt %, that ceases to be dark color ink, whereas when the quantity exceeds 20 wt %, a significant improvement in printed text and image density cannot be realized and such problems as reduced ink liquid stability take place.

It is further desirable that the combined quantities of the pigment and the fine polymer particle contained in the dark color inks and the light color inks according to the present invention be 5 to 15 wt %, respectively, with a range of 6 to 12 wt. % being preferred. By making the total of the pigment and the fine polymer particle in the ink within such range, ink discharge stability is enhanced, particularly in nozzle heads that employ electrostrictive devices.

For the solvent used in the present invention, water is preferred, with ion exchange water being even more preferable.

Other solvents can be used in combination with water, however, for the solvent. Such additional solvents may be miscible with water, enhance ink penetration to the recording media, help prevent nozzle clogging and enhance the solubility of such components as penetrating agents (described subsequently) in the ink. Examples of such solvents include alkyl alcohols having 1 to 4 carbons, such as methanol, ethanol, butanol, propanol, and isopropanol, glycol ethers such as ethyleneglycol monobutyl ether, ethyleneglycol monomethyl ether acetate, diethyleneglycol monomethyl ether, diethyleneglycol monoethyl ether, diethyleneglycol mono-n-propyl ether, ethyleneglycol mono-iso-propyl ether, diethyleneglycol mono-iso-propyl ether, ethyleneglycol mono-n-propyl ether, ethyleneglycol mono-t-butyl ether, diethyleneglycol mono t-butyl ether, 1-methyl-1-methoxybutanol, propylene glycolmonomethyl ether, propylene glycolmonoethyl ether, propyleneglycol mono-t-butyl ether, propyleneglycol mono-n propyl ether, propyleneglycol mono-iso-propyl ether, dipropyleneglycol monomethyl ether, dipropyleneglycol monoethyl ether, dipropyleneglycol mono-n-propyl ether, and dipropyleneglycol mono-iso-propyl ether or the like, and formamide, acetoamide, dimethyl sulfoxide, sorbite, sorbitane, acetine, diacetine, triacetine, and sulfolane or the like, which may be used alone or in combinations of two or more.

As described above, the ink jet recording ink set according to the present invention comprises light color inks of the plurality of colors and light color inks of the plurality of colors, and by adjusting the quantities of fine polymer particle contained in these inks and using them selectively according to the type of recording media used, the text and/or the image exhibiting excellent color production and smear resistance can be formed, whether using the ordinary paper or the special paper. According to need, however, an acetyleneglycol type surfactant can also be mixed in order to enhance print quality, an penetrating agent or a surfactant can also be mixed to further enhance the smear resistance of recorded text and images, and a water-soluble glycol, saccharide, a mildew retardant, a preservative can further be mixed to prevent nozzle clogging.

Examples of such acetylene glycol surfactants that can be mixed into the light color inks and dark color inks according to the present invention include 2,4,7,9-tetramethyl-5-decyne-4,7-diol, 3,6-dimethyl-4-octyne-3,6 diol, and 3,5-dimethyl-1-hexyne-3-ol, as well as a substance formed by adding an average 1 to 30 ethyleneoxy groups or propyleneoxy groups to the pluralities of hydroxyl groups in the substance, respectively. These may be used alone or in combination of two or more.

The quantities of these acetylene glycol surfactants contained may, whether in the light color inks or the dark color inks, be preferably between 0.5 add 3 wt %, more preferably from 0.5 to 1.5 wt %.

The penetrating agent capable of being mixed in the light color inks and dark color inks according to the present invention may be one or more selected from a group consisting of diethyleneglycol mono n butyl ether (DEGmBE), diethyleneglycol mono-t-butyl ether (DEGmtBE), triethyleneglycol mono-n-butyl ether (TEGmBE), propyleneglycol mono-n-butyl ether (PGmBE), dipropyleneglycol mono-n-butyl ether (DPCmBE), and a compound expressed by the general formula (1) below, with DEGmBE, TEGmBE, DPGmBE, and the compound expressed by the general formula (I) below being particularly preferred. In the general formula (I) below, m and n indicate presence in the system, while PO and EO may be added in a block or randomly.

$$RO-(PO)_m-(EO)_n-H \quad (I)$$

wherein R indicates an alkyl group having 4 to 10 carbons, PO represents a propylene oxy group, and EO represents an ethylene oxy group, and $m \geq 1$, $n \geq 0$, and $m+n \leq 20$.

The quantity of the penetrating agent contained may be preferably between 1 and 20 wt %, preferably between 3 and 10 wt % in the light color inks, and preferably between 1 and 20 wt %, more preferably between 2 and 10 wt % in the dark color inks. When the quantity contained is less than 1 wt %, ink penetrability declines, and the ink cannot be effectively prevented from blurring, whereas when the quantity is more than 20 wt %, the fast drying property of the ink deteriorates, and there may be possibility of occurrence of blurring.

As the surfactant that can be mixed into the light color inks and dark color inks according to the present invention, examples of amphoteric surfactants include lauryl dimethylamino acetic acid betaine, 2-alkyl-N-carboxymethyl-N-hydroxyethyl imidazolinium betaine, coconut oil fatty acid amide propyl dimethylamino acid betaine, polyocetyl polyaminoethyl glycine, and other imidazoline derivatives or the like. Examples of nonionic surfactants include polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, polyoxyalkylene alkyl ether, and other ethers, polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, polyoxyethylene stearate, and other esters, as well as fluorine-based surfactants containing other fluoroalkyl esters or perfluoroalkyl carborates or the like. These surfactants can be used alone or in combination of two or more.

Examples of water-soluble glycols that can be mixed into the light color inks and dark color inks according to the present invention include ethylene glycol, diethylene glycol, triethylene glycol, tetraethylene glycol, propylene glycols dipropylene glycol, tripropylene glycol, polyethylene glycols having a molecular weight of 2000 or less, 1,3-propylene glycol, isopropylene glycol, isobutylene glycol, 1,4-butanediol, 1,3-butanediol, 1,5-pentanediol, 1,6-hexanediol, glycerin, mesoerythritol, and pentaerythritol, which can be used alone or in combination of two or more.

The quantity of such water-soluble glycol contained may be between 5 and 20 wt %, more preferably between 8 and 15 wt % in the light color inks, and between 5 and 30 wt %, more preferably between 10 and 20 wt % in the dark color inks.

Examples of the saccharides that can be mixed into the light color inks and dark color inks according to the present invention include glucose, mannose, fructose, ribose, xylose, arabinose, lactose, galactose, aldonic acids, glucitose, maltose, cellobiose, sucrose, trehalose, maltotriose, alginic acid and salts thereof, cyclodextrinws, and celluloses, which can be used alone or in combination of two or more.

The quantity of such saccharide contained may be preferably between 0 and 10 wt %, more preferably between 2 and 6 wt % in the light color inks, and preferably between 0 and 15 wt %, more preferably between 2 and 10 wt % in the dark color inks.

Examples of mildew retardants and preservatives that can be mixed into the light color inks and dark color inks according to the present invention include sodium benzoate, sodium pentachlorophenol, sodium 2-pyridinethiol-1-oxide, sodium sorbinate, sodium dehydroacetate, and 1,2-dibenzenethiazoline-3-one (Proxel CRL, Proxel BDN, Proxel GXL, Proxel XL-2, and Proxal TN, made by Avecia), which can be used alone or in combination of two or more.

The quantity of such mildew retardants and preservatives contained may be preferably between 0.01 and 0.5 wt %, more preferably between 0.03 and 0.1 wt % in the light color inks and the dark color inks.

In addition, as may be necessary, various other additives can be included in the light color inks and dark color inks according to the invention. Examples thereof include a surface tension adjustor, a pH adjustor, a viscosity adjustor, an anti-oxidant, a UV absorbent, a defoaming agent, a chelating agent, and an oxygen-absorbent, which can be used alone or in combination of two or more.

In terms of enhancing the discharge stability of the light color inks and dark color inks according to the present invention, a surface tension thereof, respectively, may be preferably between 29 and 40 mN/m, more preferably between 30 and 34 mN/m. The surface tension adjustor noted above can also be added in order to adjust the surface tension within those ranges.

Surface tension is measured according to JIS K 3211.

In a case where the surface of the pigment is anionic, the pH of the light color inks and dark color inks according to the present invention may be preferably made 7 to 11, and more preferably 8 to 10, in terms of enhancing she print density and liquid stability. For the pH adjustor used to adjust the pH within those ranges, an inorganic base such as sodium hydroxide, potassium hydroxide, or lithium hydroxide, or ammonia, triethanolamine, ethyldiethanolamine, or diethylethanolamine, and a tertiary amine having 6 to 10 carbons can be added.

In terms of improving the discharge stability of the light color inks and dark color inks according to the present invention, the viscosity at 20° C. therein may be made 2 to 10 mPa·s, with a range of 3 to 6 mPa·s being particularly preferred. Examples of viscosity adjustors which can be used for adjusting the viscosity within those ranges include resins, alginic acids, polyvinyl alcohols, hydroxypropyl cellulose, carboxymethyl cellulose, hydroxyethyl cellulose, methyl cellulose, polyacrylic acid salts, polyvinyl pyrrolidones, and arabia rubber starches or the like. As will be described below, discharge stability and color reproducibility can be also enhanced by adjusting the solid portion concentration in each color of the light color inks and dark color inks.

As to the method for preparing the light color inks and dark color inks according to the present invention, a commonly known apparatus such as a ball mill, a sand mill, an attriter, a basket mill, or a roll mill can be used in this preparation. In such preparation, it is preferable to make adjustments so that the viscosity, solid portion concentration (the weight concentration of the total quantity of the pigment and the fine polymer particle noted above), and the quantities of other components (i.e. components other than the pigment, the solvent and fine polymer particle), such as the penetrating agents noted above, contained in the various colors of ink, be nearly identical between the various colors of ink, respectively, in terms of minimizing ink property differences from one color to another, of enhancing print quality and discharge stability and of facilitating control of head drive voltages and drive frequencies or the like. In the ink jet recording ink sets of the present invention, because certain quantities of the fine polymer particle are contained in the light color inks, wherein the quantity of the pigment contained is relatively small, and the viscosity tends to become relatively low, and because the fine polymer particle are either not contained, or are contained in a quantity that is less than that in the light color inks, in the dark color inks, wherein the quantity of the pigment contained is relatively large, and the viscosity tends to become relatively high, there is not very much difference of viscosity or solid portion concentration between the light color inks and the dark color inks, whereupon the adjustments noted above can be made easily.

When preparing the inks according to the present invention, the coarse particle is preferably removed. It is desirable that the ink obtained by mixing the components noted in the foregoing together be filtered through a membrane filter or mesh filter or the like to remove all particles having its size of 1 $\mu$m or larger, and preferably 0.5 $\mu$m or larger. By performing such a process, the ink is obtained which do not induce nozzle clogging.

The ink jet recording ink set of the present invention, in like manner as conventional ink sets of this type, can be mounted onto ink jet recording apparatuses (ink jet printers), and form the text and/or the image on both the ordinary paper and the special paper with one and the same system. In this case the dark color inks of the plurality of colors are mainly used for the ordinary paper, and the light color inks of the plurality of colors are mainly used for the special paper. More specifically, the dark color inks of the plurality of colors which is used for the ordinary paper preferably constitute 60% or more, and more preferably 70% or more, relative to the total volume of the ink discharged on the ordinary paper. The light color inks of the plurality of colors used for the special paper preferably constitute 60% or more, and more preferably 70% or more, relative to the total volume of the ink discharged on the special paper. By employing the ink jet recording ink set of the present invention in this manner, it is possible therewith to form the text and/or the image exhibiting excellent color production on either the ordinary paper or the special paper. Also, because the fine polymer particle are contained in prescribed quantities in the light color inks of the plurality of colors used mainly for the special paper (that quantity being greater than in the dark color inks), the text and/or the image having excellent smear resistance can be formed on the special paper.

In the ink jet recording apparatus noted above, a driver is also mounted. By switching the settings of this driver, the text and/or the image can be formed on both the ordinary paper and the special paper with one and the same recording apparatus. More specifically, it is possible to switch the driver settings and select either the ordinary paper or the special paper, according to the customer need.

EMBODIMENTS

The present invention is now described specifically in conjunction with embodiments, but these embodiments do not limit the scope of the present invention.

Examples 1, 2, and 3 are embodiments of ink jet recording ink sets of the present invention. Comparative examples 1 to 3 are comparative examples wherein the quantity of the fine polymer particle (emulsion) contained is outside the range defined in the present invention. Comparative example 4 is a comparative example wherein the solid portion of each color of ink in the light color and dark color inks is outside the range defined in the present invention. Examples 4 and 5 are embodiments of the ink jet recording method of the present invention. Comparative examples 5 to 9 are comparative examples of ink jet recording methods.

In the examples described below, "parts" and "%" represent parts by weight and wt %, unless otherwise noted.

EXAMPLE 1

Using self-dispersing pigments obtained according to the "One Method of Preparing Self-Dispersing Pigments" which is described in the foregoing, and emulsions A to D obtained by the "Emulsion Preparation" described below, pigment inks of eight colors having the compositions noted below were prepared. Thus were obtained four colors of pigment inks for the light color inks, namely light black (Lk), light cyan (Lc), light magenta (Lm) and light yellow (Ly), and four colors of pigment inks for the dark color inks, namely black (K), cyan (C), magenta (M), and yellow (Y).

Emulsion Preparation

Emulsions A to D having fine polymer particle as the dispersing material were obtained by the "one method of preparing emulsions" given above. The compositions of the monomer solutions and reaction solutions used in the preparation are given in Table 1 below.

TABLE 1

(Units: parts by weight)

|  | Emulsion | | | |
| --- | --- | --- | --- | --- |
| Component | A | B | C | D |
| Monomer solution | | | | |
| Sodium lauryl sulfate | 0.05 | 0.05 | 0.05 | 0.05 |
| Glycidoxy acrylate | 4 | " | " | " |
| Tetrahydrofurfuryl acrylate | 6 | " | " | " |
| Butyl methacrylate | 5 | 15 | 10 | 15 |
| Glycidoxy methacrylate | " | 5 | 2 | " |
| Benzyl methacrylate | " | " | 16 | " |
| Styrene | 5 | 10 | 15 | 15 |
| t-dodecyl mercaptan | 0.02 | 0.02 | 0.02 | 0.02 |
| Ion exchange water | 7 | 7 | 7 | 7 |
| Reaction liquid | | | | |
| Sodium lauryl sulfate | 0.2 | 0.2 | 0.2 | 0.2 |
| Styrene | 30 | 35 | 30 | 30 |
| Butyl methacrylate | 25 | " | 15 | 15 |
| Butyl acrylate | 6 | 25 | " | " |
| Acrylic acid | 2 | 10 | 10 | " |
| 1, 6-hexanediol dimethacrylate | 1 | " | 1 | " |
| Dipentaerythritol | " | " | " | 1 |

TABLE 1-continued (Units: parts by weight)

| Component | Emulsion | | | |
|---|---|---|---|---|
| | A | B | C | D |
| hexamethacrylate | | | | |
| t-dodecyl mercaptan | 0.5 | 0.5 | 0.5 | 0.6 |
| Acrylamide | " | 1 | " | 1 |
| Triethanol propane trimethacrylate | " | " | 1 | " |

<Light black ink composition>

| | |
|---|---|
| Carbon black (#990, Mitsubishi Chemical Corp) | 1.5% |
| Emulsion B (fine polymer particle concentration) | 5.0% |
| Compound expressed by general formula (T) above (wherein R is a methylisobutyl carbinol group, m - 5, n - 1.5, and addition is made in order of PO, EO.) | 5.0% |
| Dipropylene glycol | 5.0% |
| Surfynol TG | 1.2% |
| Triethanolamine | 0.1% |
| Ion exchange water | balance |
| Total | 100% |

<Light cyan ink composition>

| | |
|---|---|
| Copper phthalocyanine (Clariant (Japan) K.K.) | 0.7% |
| Emulsion D (fine polymer particle concentration) | 5.5% |
| DEGmBE | 10.0% |
| 1,6-hexanediol | 5.0% |
| Tripropylene glycol | 2.0% |
| Surfynol 104 | 0.8% |
| Surfynol 465 | 0.4% |
| Ion exchange water | balance |
| Total | 100% |

<Light magenta ink composition>

| | |
|---|---|
| Dimethyl quinacridone (Clariant (Japan) K.K.) | 0.5% |
| DPGmBE | 2.0% |
| DECmBE | 10.0% |
| Emulsion B (fine polymer particle concentration) | 2.0% |
| Emulsion D (fine polymer particle concentration) | 3.5% |
| Neopentyl glycol | 5.0% |
| Surfynol TC | 0.5% |
| Surfynol 104 | 0.5% |
| Ion exchange water | balance |
| Total | 100% |

<Light yellow ink composition>

| | |
|---|---|
| Diketopyrrolopyrrole (Clariant (Japan) K.K.) | 0.6% |
| Emulsion B (fine polymer particle concentration) | 3.5% |
| Emulsion C (fine polymer particle concentration) | 2.5% |
| Compound expressed by a general formula (I) above (wherein R is an isooctanol group, m = 6, n = 2, and addition is made in order of EO, PO.) | 2.5% |
| DEGmtD | 5.0% |
| DEGmBE | 2.0% |
| Diethylene glycol | 5.0% |
| Tetrapropylene glycol | 5.0% |
| Olfin E1010 | 1.0% |
| Ion exchange water | balance |
| Total | 100% |

<Black ink composition>

| | |
|---|---|
| Carbon black (Raven C, Colombian Carbon) | 8.0% |
| Emulsion A (fine polymer particle concentration) | 2.0% |
| PGmBE | 5.0% |
| DEGmBE | 7.0% |
| Glycerin | 6.0% |
| 1,5-pentanediol | 5.0% |
| Olfin 1010 | 1.0% |
| Triethanolamine | 0.2% |
| Ion exchange water | balance |
| Total | 100% |

<Cyan ink composition>

| | |
|---|---|
| Copper phthalocyanine (Clariant (Japan) K.K.) | 6.0% |
| Emulsion C (fine polymer particle concentration) | 3.0% |
| PGmBE | 5.0% |
| DEGmBE | 10.0% |
| Propylene glycol | 7.0% |
| Triethylene glycol | 3.0% |
| 1,6-hexanediol | 5.0% |
| Surfynol TG | 0.4% |
| Potassium hydroxide | 0.1% |
| Ion exchange water | balance |
| Total | 100% |

<Magenta ink composition>

| | |
|---|---|
| Dimethyl quinacridone (Clariant (Japan) K.K.) | 8.0% |
| Emulsion A (fine polymer particle concentration) | 0.5% |
| Emulsion D (fine polymer particle concentration) | 0.5% |
| PGmBE | 5.0% |
| DEGmBE | 10.0% |
| 2 pyrrolidone | 3.0% |
| Trimethylol propane | 3.0% |
| Surfynol TG | 1.2% |
| Triethanolamine | 0.9% |
| Ion exchange water | balance |
| Total | 100% |

<Yellow ink composition>

| | |
|---|---|
| Diketopyrrolopyrrole (Clariant (Japan) K.K.) | 7.5% |
| Emulsion A (fine polymer particle concentration) | 0.5% |
| Emulsion B (fine polymer particle concentration) | 0.5% |
| TEGmBE | 10.0% |
| Glycerin | 5.0% |
| Trimethylol propane | 5.0% |
| Trimethylol ethane | 5.0% |
| Olfin E1010 | 1.0% |
| Surfynol TG | 0.6% |
| Triethanolamine | 0.9% |
| Ion exchange water | balance |
| Total | 100% |

EXAMPLE 2

An ink set 2 was obtained comprising 8 colors of pigment ink having the same composition as in ink set 1 except that the four colors of the dark color inks of ink set 1 of Example 1 do not contain an emulsion (fine polymer particles).

EXAMPLE 3

An ink set 3 was prepared in a similar procedure as in Example 1, comprising 8 colors of pigment inks having the compositions noted below.

<Light black ink composition>

| | |
|---|---|
| Carbon black (#990, Mitsubishi Chemical Corp) | 1.5% |
| Emulsion B (fine polymer particle concentration) | 7.0% |
| Compound expressed by the general formula (I) above (wherein R is a methylisobutyl carbonol group, m - 5, n - 1.5, and addition is made in order of PO, EO.) | 5.0% |

-continued

| | |
|---|---|
| Dipropylene glycol | 5.0% |
| Surfynol TG | 1.2% |
| Triethanolamine | 0.1% |
| Ion exchange water | balance |
| Total | 100% |

<Light cyan ink composition>

| | |
|---|---|
| Copper phthalocyanine (Clariant (Japan) K.K.) | 0.7% |
| Emulsion D (fine polymer particle concentration) | 5.5% |
| DEGmBE | 10.0% |
| 1,6-hexanediol | 5.0% |
| Tripropylene glycol | 2.0% |
| Surfynol 104 | 0.0% |
| Surfynol 465 | 0.4% |
| Ion exchange water | balance |
| Total | 100% |

<Light magenta ink composition>

| | |
|---|---|
| Dimethyl guinacridone (Clariant (Japan) K.K.) | 0.5% |
| DPGmBE | 2.0% |
| DEGmBE | 10.0% |
| Emulsion B (fine polymer particle concentration) | 4.0% |
| Emulsion D (fine polymer particle concentration) | 3.5% |
| Neopentyl glycol | 5.0% |
| Surfynol TG | 0.5% |
| Surfynol 104 | 0.5% |
| Ion exchange water | balance |
| Total | 100% |

<Light yellow ink composition>

| | |
|---|---|
| Diketopyrrolopyrrole (Clariant (Japan) K.K.) | 0.6% |
| Emulsion B (fine polymer particle concentration) | 3.5% |
| Emulsion C (fine polymer particle concentration) | 3.5% |
| Compound Expressed by the general formula (T) above (wherein R is an isooctanol group, m - 6, n - 2, and addition is made in order of EO, PO.) | 2.5% |
| DEGmtB | 5.0% |
| DEGmBE | 2.0% |
| Diethylene glycol | 5.0% |
| Tetrapropylene glycol | 5.0% |
| Olfin E1010 | 1.0% |
| Ion exchange water | balance |
| Total | 100% |

<Black ink composition>

| | |
|---|---|
| Carbon black (Raven C, Columbian Carbon) | 8.0% |
| Emulsion A (fine polymer particle concentration) | 1.0% |
| PGmBE | 5.0% |
| DEGmBE | 7.0% |
| Glycerin | 6.0% |
| 1,5-pentanediol | 5.0% |
| Olfin E1010 | 1.0% |
| Triethanolamine | 0.2% |
| Ion exchange water | balance |
| Total | 100% |

<Cyan ink composition>

| | |
|---|---|
| Copper phthalocyanine (Clariant (Japan) K.K.) | 6.0% |
| Emulsion C (fine polymer particle concentration) | 1.0% |
| PGmBE | 5.0% |
| DEGmBE | 10.0% |
| Propylene glycol | 7.0% |
| Triethylene glycol | 3.0% |
| 1,6-hexanediol | 5.0% |
| Surfynol TG | 0.4% |
| Potassium hydroxide | 0.1% |
| Ion exchange water | balance |
| Total | 100% |

<Magenta ink composition>

| | |
|---|---|
| Dimethyl quinacridone (Clariant (Japan) K.K.) | 8.0% |
| Emulsion A (fine polymer particle concentration) | 0.5% |

-continued

| | |
|---|---|
| Emulsion D (fine polymer particle concentration) | 0.5% |
| PGmBE | 5.0% |
| DEGmBE | 10.0% |
| 2-pyrrolidone | 3.0% |
| Trimethylol propane | 3.0% |
| Surfynol TG | 1.2% |
| Triethanolamine | 0.9% |
| ion exchange water | balance |
| Total | 100% |

<Yellow ink composition >

| | |
|---|---|
| Diketopyrrolopyrrole (Clariant (Japan) K.K.) | 6.5% |
| Emulsion A (fine polymer particle concentration) | 0.5% |
| Emulsion B (fine polymer particle concentration) | 0.5% |
| TEGmBE | 10.0% |
| Glycerin | 5.0% |
| Trimethylol propane | 5.0% |
| Trimethylol ethane | 5.0% |
| Olfin E1010 | 1.0% |
| Surfynol TG | 0.6% |
| Triethanolamine | 0.9% |
| Ion exchange water | balance |
| Total | 100% |

Comparative Example 1

An ink set 4 was obtained which comprises 8 colors of pigment inks having the same compositions as ink set 1 of Example 1, except that all of the inks of the ink set 1 contain no emulsion (fine polymer particle).

Comparative Example 2

An ink set 5 was obtained which comprises 8 colors of pigment inks having the same compositions as ink set 1 of Example 1, except that the respective quantities (concentrations) of emulsions (fine polymer particle) contained in the inks of the ink set 1 were made as noted below.

| | |
|---|---|
| Light black ink: | |
| Emulsion B (fine polymer particle concentration) | 0% |
| Light cyan ink: | |
| Emulsion D (fine polymer particle concentration) | 0% |
| Light magenta ink: | |
| Emulsion B (fine polymer particle concentration) | 0% |
| Emulsion D (fine polymer particle concentration) | 0% |
| Light yellow ink: | |
| Emulsion B (fine polymer particle concentration) | 0% |
| Emulsion C (fine polymer particle concentration) | 0% |
| Black ink: | |
| Emulsion A (fine polymer particle concentration) | 0.5% |
| Cyan ink: | |
| Emulsion C (fine polymer particle concentration) | 0.5% |
| Magenta ink: | |
| Emulsion A (fine polymer particle concentration) | 0.2% |
| Emulsion D (fine polymer particle concentration) | 0.3% |
| Yellow ink: | |
| Emulsion A (fine polymer particle concentration) | 0.3% |
| Emulsion B (fine polymer particle concentration) | 0.1% |

Comparative Example 3

An ink set 6 was obtained which comprises 8 colors of pigment inks having the same compositions as ink set 1 in Example 1, except that the respective quantities (concentrations) of emulsions (fine polymer particle) contained in the inks in the ink set 1 were made as noted below.

| Light black ink: | |
|---|---|
| Emulsion B (fine polymer particle concentration) | 0.1% |
| Light cyan ink: | |
| Emulsion D (fine polymer particle concentration) | 0.1% |
| Light magenta ink: | |
| Emulsion B (fine polymer particle concentration) | 0.1% |
| Emulsion D (fine polymer particle concentration) | 0.1% |
| Light yellow ink: | |
| Emulsion B (fine polymer particle concentration) | 0.1% |
| Emulsion C (fine polymer particle concentration) | 0.1% |
| Black ink: | |
| Emulsion A (fine polymer particle concentration) | 0.5% |
| Cyan ink: | |
| Emulsion C (fine polymer particle concentration) | 0.5% |
| Magenta ink: | |
| Emulsion A (fine polymer particle concentration) | 0.2% |
| Emulsion D (fine polymer particle concentration) | 0.3% |
| Yellow ink: | |
| Emulsion A (fine polymer particle concentration) | 0.3% |
| Emulsion B (fine polymer particle concentration) | 0.3% |

Comparative Example 4

An ink set 7 was obtained which comprises 8 colors of pigment inks having the same compositions as ink set 1, except that the respective quantities (concentrations) of emulsions (fine polymer particles) contained in the inks in ink set 1 of Example 3 were made as noted below.

| <Light black ink composition> | |
|---|---|
| Carbon black (#990, Mitsubishi Chemical Corp) | 1.5% |
| Emulsion B (fine polymer particle concentration) | 7.0% |
| Compound expressed by general formula (I) above (wherein R is a methylisobutyl carbinol group, m = 5, n = 1.5, and addition is made in order of PO, EO.) | 5.0% |
| Dipropylene glycol | 5.0% |
| Surfynol TG | 1.2% |
| Triethanolamine | 0.1% |
| Ion exchange water | balance |
| Total | 100% |
| <Light cyan ink composition> | |
| Copper phthalocyanine (Clariant (Japan) K.K.) | 0.7% |
| Emulsion D (fine polymer particle concentration) | 5.5% |
| DEGmBE | 10.0% |
| 1,6-hexanediol | 5.0% |
| Tripropylene glycol | 2.0% |
| Surfynol 104 | 0.8% |
| Surfynol 465 | 0.4% |
| Ion exchange water | balance |
| Total | 100% |

-continued

| <Light magenta ink composition> | |
|---|---|
| Dimethyl quinacridone (Clariant (Japan) K.K.) | 0.5% |
| DPGmBE | 2.0% |
| DEGmBE | 10.0% |
| Emulsion B (fine polymer particle concentration) | 4.0% |
| Emulsion D (fine polymer particle concentration) | 3.5% |
| Neopentyl glycol | 5.0% |
| Surfynol TG | 0.5% |
| Surfynol 104 | 0.5% |
| Ion exchange water | balance |
| Total | 100% |
| <Light yellow ink composition> | |
| Diketopyrrolopyrrole (Clariant (Japan) K.K.) | 0.6% |
| Emulsion B (fine polymer particle concentration) | 3.5% |
| Emulsion C (fine polymer particle concentration) | 2.5% |
| Compound expressed by general formula (I) above (wherein R is an isooctanol group, m = 6, n = 2, and addition is made in order of EO, PO.) | 2.5% |
| DEGmtB | 5.0% |
| DEGmBE | 2.0% |
| Diethylene glycol | 5.0% |
| Tetrapropylene glycol | 5.0% |
| Olfin E1010 | 1.0% |
| Ion exchange water | balance |
| Total | 100% |
| <Black ink composition> | |
| Carbon black (Raven C, Colombian Carbon) | 6.0% |
| Emulsion A (fine polymer particle concentration) | 0.5% |
| PGmBE | 5.0% |
| DEGmBE | 7.0% |
| Glycerin | 6.0% |
| 1,5-pentanediol | 5.0% |
| Olfin E1010 | 1.0% |
| Triethanolamine | 0.2% |
| Ion exchange water | balance |
| Total | 100% |
| <Cyan ink composition> | |
| Copper phthalocyanine (Clariant (Japan) K.K.) | 6.0% |
| Emulsion C (fine polymer particle concentration) | 1.5% |
| PGmBE | 5.0% |
| DEGmBE | 10.0% |
| Propylene glycol | 7.0% |
| Triethylene glycol | 3.0% |
| 1,6-hexanediol | 5.0% |
| Surfynol TG | 0.4% |
| Potassium hydroxide | 0.1% |
| Ion exchange water | balance |
| Total | 100% |
| <Magenta ink composition> | |
| Dimethyl quinacridone (Clariant (Japan) K.K.) | 8.0% |
| Emulsion A (fine polymer particle concentration) | 1.0% |
| Emulsion D (fine polymer particle concentration) | 1.0% |
| PGmBE | 5.0% |
| DEGmBE | 10.0% |
| 2-pyrrolidone | 3.0% |
| Trimethylol propane | 3.0% |
| Surfynol TG | 1.2% |
| Triethanolamine | 0.9% |
| Ion exchange water | balance |
| Total | 100% |
| <Yellow ink composition> | |
| Diketopyrrolopyrrole (Clariant (Japan) K.K.) | 7.5% |
| Emulsion A (fine polymer particle concentration) | 1.0% |
| Emulsion B (fine polymer particle concentration) | 1.0% |
| TEGmBE | 10.0% |
| Glycerin | 5.0% |
| Trimethylol propane | 5.0% |

| | | | |
|---|---|---|---|
| Trimethylol ethane | | | 5.0% |
| Olfin E1010 | | | 1.0% |
| Surfynol TG | | | 0.6% |
| Triethanolamine | | | 0.9% |
| Ion exchange water | | | balance |
| Total | | | 100% |

EXAMPLE 4

The viscosity in each of the inks in ink set 1 at a temperature or 20° C. was adjusted to 4 to 5 mPa·s, respectively, while varying the added quantities of glycols, diols or glycerin having humectant effect. Then ink set 1 was loaded into an ink jet printer (product name "PM750C," made by Seiko-Epson). This ink set 1 was used to produce printed image, performing test printings in each respective color, so that for the ordinary paper 70% of the total quantity of ink discharged on this ordinary paper was comprised of the four colors of the dark color inks (with the remainder comprised of the four colors of the light color inks), and so that for special paper 70% of the total quantity of ink discharged on the special paper was comprised of the four colors of the light color inks (with the remainder comprised of the four colors of the dark color inks).

EXAMPLE 5

Printed image was produced in a similar procedure as Example 4 except that the ink set 2 of Example 2 was used instead of the ink set 1 of Example 1.

Comparative Example 5

Printed image was produced as in Example 4 except that the ink set 4 of comparative example 1 was used instead of the ink set 1 of Example 1.

Comparative Example 6

Printed image was produced as in Example 4 except that the ink set 5 of comparative example 2 was used instead of the ink set 1 of Example 1.

Comparative Example 7

Printed image was produced as in Example 4 except that the ink set 6 of comparative example 3 was used instead of the ink set 1 of Example 1.

Comparative Example 8

Printed image was produced as in Example 4 except that ink set 1 was used so that, in Example 4, for the ordinary paper, 50% of the total quantity of ink discharged on this ordinary paper was comprised of the four colors or the light color inks (with the remainder being the four colors of the dark color inks), and so that, for the special paper, 50% of the total quantity of ink discharged on this special paper was comprised of the four colors of the dark color inks (with the remainder being the four colors of the dark color of the light color inks).

Comparative Example 9

Printed image was produced as in Example 5 except that ink set 2 was used so that, in Example 5, for ordinary paper, 70% of the total quantity of ink discharged on this ordinary paper was comprised of the four colors of the light color inks (with the remainder being the four colors of the dark color inks), and so that, for the special paper, 70% of the total quantity of ink discharged on this special paper was comprised of the four colors of the dark color inks (with the remainder being the four colors of the light color inks).

The ink viscosity matching and ink discharge characteristics in Examples 1, 2, and 3 (ink sets 1, 2, and 3) and comparative examples 1 to 4 (ink sets 4 to 7) were evaluated as noted below. The results are given in Table 2 below.

Ink Viscosity Matching Evaluation

The variation in viscosity between the various colors of inks in the ink sets was evaluated by taking viscosity ratios. These evaluations were done according to the following evaluation criteria.

Evaluation Criteria

A: Good (viscosity ratio within ±5%).

B: Practical level (viscosity ratio within ±10%).

C: Not practical level (viscosity ratio within ±15%).

D: Far from practical level (viscosity ratio exceeds ±15%).

<Evaluation of Ink Discharge Characteristics>

Prescribed patterns were printed and, while visually inspecting these patterns to detect the presence of printing discrepancies for each color, such discharge control signals as the discharge voltage and discharge frequency of the printer were controlled as necessary, and the ink discharge characteristics at that time were evaluated. These evaluations were made according to the following evaluation criteria.

<Evaluation criteria>

A: Good (possible to effect discharge control with same system)

B: Practical level (requires a little control)

C: Not practical level (requires much control)

D: Far from practical level (requires circuitry or a separate system)

TABLE 2

| | Ink set | Ink viscosity matching | Ink discharge characteristics |
|---|---|---|---|
| Example 1 | 1 | A | A |
| Example 2 | 2 | A | A |
| Example 3 | 3 | A | A |
| Comparative example 1 | 4 | B | B |
| Comparative example 2 | 5 | C | C |
| Comparative example 3 | 6 | D | D |
| Comparative example 4 | 7 | D | D |

Color production and smear resistance were evaluated in the printed images obtained from Examples 4 and 5 and comparative examples 5 to 9 by the methods described below. The results are listed in Table 1 below.

<Color Production Evaluation Method>

Test printings were done as described above on the ordinary paper (product name: "Xerox P," made by Xerox) and the special paper (special glossy paper for use in Epson printers), respectively. The printed images obtained therewith was allowed to stand for 24 hours in an environment of 25° C. temperature and 50% relative humidity. Then, using an optical densitometer (model "SPM-50" made by Gretag), the optical density (OD) of the black (Lk and K) test printings was measured, and the color maturation ($C^W$) of the color (Lc, Lm, Ly, C, M, and Y) test printings was measured. These were then evaluated according to the following evaluation criteria, respectively.

Evaluation Criteria

A: Ordinary paper: $OD \geqq 1.3$ and $C^W \geqq 50$.
Special paper: $OD \geqq 1.5$ and $C^W \geqq 60$.
Color production good.

B: Ordinary paper: $1.3 > OD \geqq 1.2$ and $50 > C^W \geqq 40$.
Special paper: $1.5 > OD \geqq 1.3$ and $60 > C^W \geqq 50$.
Color production no problem.

C: Ordinary paper: $OD < 1.2$ and/or $C^W < 40$.
Special paper: $OD < 1.3$ and/or $C^W < 50$.
Not suitable for practical use.

Smear Resistance Evaluation Method

On the surfaces of each of the test printings in printed images obtained by test-printing on the ordinary paper (product name; "Xerox P" made by Xerox Japan) and the special paper (product name "Superfine Senyoshi," made by Seiko-Epson), respectively, a rubber eraser (width=20 mm) was secured at an angle of inclination of 60°, a load of 1 kg was placed thereon, and the eraser was rubbed back and forth 10 times over the text printing. A visual inspection was then made of the resulting condition of mach test printing surface, and evaluations were made according to the following evaluation criteria.

TABLE 3

|  | Ink set | Color production | | Smear resistance | |
| --- | --- | --- | --- | --- | --- |
|  |  | Ordinary paper | Special paper | Ordinary paper | Special paper |
| Example 4 | 4 | A | A | A | A |
| Example 5 | 5 | A | A | B | A |
| Comparative example 5 | 4 | A | A | B | C |
| Comparative example 6 | 5 | A | A | B | C |
| Comparative example 7 | 6 | A | A | A | C |
| Comparative example 8 | 1 | B | A | A | C |
| Comparative example 9 | 2 | C | A | B | C |

(Evaluation criteria)
A: No scratches or peeling in print surface; smear resistance good.
B: Scratches in print surface; no problems in practice use
C: Feeling developed in print surface; not suitable for practical use As can be evident from Table 2, the ink sets in Examples 1, 2, and 3 (i.e. the ink sets 1, 2, and 3) exhibit excellent ink viscosity matching and ink discharge characteristics compared to the ink sets in comparative examples 1 to 4 (i.e. the ink sets 4 to 7). It can be seen that the ink sets in comparative examples 2, 3, and 4 (i.e. the ink sets 5, 6, and 7) are inferior in terms of ink viscosity matching and ink discharge characteristics, and that it is difficult to perform ink discharge control.

As can be evident from the results indicated in Table 3, furthermore, the printed image in Examples 4 and 5 is superior to that in comparative examples 5 to 9 in terms of color production and smear resistance.

The present invention is not limited to the specifically disclosed embodiments, and variation and modifications may be made without departing from the scope of the present invention.

The present invention is based on Japanese priority applications No. 2000-116787 filed on Apr. 18, 2000 and No. 2001-106996 filed on Apr. 5, 2001, the entire contents of which are hereby incorporated by reference.

What is claimed is:

1. An ink jet recording ink set comprising:
   light color inks of a plurality of colors, each of the light color inks having at least a pigment, water and a fine polymer particle; and
   dark color inks of a plurality of colors, each of the dark color inks having at least a pigment and water,
   wherein each of the dark color inks either does not contain a fine polymer particle or contains a fine polymer particle in smaller quantity than any of said light color inks.

2. The ink set recording ink set according to claim 1, wherein said light color inks of the plurality of colors include a light cyan ink, a light magenta ink and a yellow ink, and said dark color inks of the plurality of colors include a black ink, a cyan ink and a magenta ink.

3. The ink jet recording ink set according to claim 1, wherein said light color inks of the plurality of colors include a light cyan ink, a light magenta ink and a yellow ink, and said dark color inks of the plurality of colors include a black ink, a cyan ink, a magenta ink and a dark yellow ink.

4. The ink jet recording ink set according to claim 1, wherein said light color inks of the plurality of colors include a light black ink, a light cyan ink, a light magenta ink and a yellow ink, and said dark color inks of the plurality of colors include a black ink, a cyan ink and a magenta ink.

5. The ink jet recording ink set according to claim 1, wherein said light color inks of the plurality of colors include a light black ink, a light cyan ink, a light magenta ink and a yellow ink, and said dark color inks of the plurality of colors include a black ink, a cyan ink, a magenta ink and a dark yellow ink.

6. The ink jet recording ink set according to claim 1, wherein said light color inks contain said fine polymer particle in a quantity of from 0.5 to 10 wt %, and said dark color inks contain said fine polymer particle in a quantity of from 0 to 5 wt %.

7. The ink jet recording ink set according to claim 1, wherein an average particle size of said fine polymer particle is between 50 and 250 nm.

8. The ink jet recording ink set according to claim 1 wherein surface tension of said dark color inks and said light color inks is between 20 and 40 mN/m.

9. The ink jet recording ink set according to claim 1 wherein said dark color inks and said light color inks also contain an acetylene glycol surfactant, and a quantity of said acetylene glycol surfactant contained is between 0.5 and 3 wt %.

10. The ink jet recording ink set according to claim 1, wherein said dark color inks and said light color inks further contain one or more penetrating agents selected from the group consisting of diethylene glycol mono-n-butyl ether, diethylene glycol mono-t-butyl ether, triethylene glycol mono-n-butyl ether, propylene glycol mono-n-butyl ether, dipropylene glycol mono-n-butyl ether, and a compound expressed by the following formula (I), and a quantity of said penetrating agents contained is between 1 and 20 wt %:

$$RO-(PO)_m-(EO)_n-H \qquad (I)$$

wherein R represents an alkyl group having 4 to 10 carbons, PO represents a propyleneoxy group, EO represents an ethyleneoxy group, $m \geqq 1$, $n \geqq 0$, and $m+n \leqq 20$.

11. The ink jet recording ink set according to claim 1, wherein said pigment is self-dispersing pigment and/or dispersant dispersing pigment.

12. The ink jet recording ink set according to claim 11, wherein said self-dispersing pigment has in a surface thereof one or more functional groups selected from the group consisting of a carboxyl group, a carbonyl group, a hydroxyl group, and a sulfonic acid group.

13. The ink jet recording ink set according to claim 1, wherein a total quantity of said pigment and said fine polymer particle contained in each of said dark color inks is between 5 and 15 wt %, and a total quantity of said pigment and said fine polymer particle contained in each of said light color inks is between 5 and 15 wt %.

14. An ink jet recording method for forming a text and/or an image on an ordinary paper or a special ink jet recording paper comprising:
(a) providing the ink jet recording ink set according to claim 1,
(b) preferentially depositing said dark color inks of the plurality of colors on said ordinary paper; and
(c) preferentially depositing said light color inks of the plurality of colors on said special ink jet recording paper.

15. A recorded image obtained by the ink jet recording method according to claim 14.

16. An ink jet recording method for forming a text and/or an image on an ordinary paper or a special ink jet recording paper comprising:
(a) providing the ink jet recording ink set according to claim 1, and switching a recording mode by a setting of a driver mounted in an ink jet recording device such that said dark color inks are preferentially deposited on said ordinary paper and said light color inks are preferentially deposited on said special ink jet recording paper.

17. An ink jet recording apparatus comprising (a) means for forming a tet and/or images on an ordinary paper or a special ink jet recording paper, and (b) said ink jet recording ink set according to claim 1.

18. The ink jet recording ink set according to claim 1, wherein the water is present in each of the light color inks and in each of the dark color inks in an amount by wt % that is greater than an amount of any other component present in the respective light color inks and dark color inks.

19. The ink jet recording ink set according to claim 1, wherein each of the light color inks and each of the dark color inks comprises an additional solvent that is miscible with water.

20. The ink jet recording ink set according to claim 1, wherein the fine polymer particle is mixed into the ink in an emulsion form.

21. An ink jet recording ink set comprising:
light color inks of a plurality of colors, each of the light color inks having a pigment, water and a fine polymer particle; and
dark color inks of a plurality of colors, each color of said dark color inks corresponding to the same color hue of a color of said light color inks and each of said dark color inks having a pigment and water or having a pigment, water and a fine polymer particle,
wherein said ink recording ink set has a relationship expressed by the following formula:

$$0.8 \cdot X \leq Y \leq 1.2 \cdot X$$

wherein when pigments and fine polymer particles are solids, a weight percentage of said solids of said light color inks is given by X %, and a weight percentage of said solids in said dark color inks of same color hue as a color of said light color inks is given by Y %.

22. The ink jet recording ink set according to claim 21, wherein said light color inks of the plurality of colors include a light black ink, a light cyan ink, a light magenta ink and a light yellow ink, and said dark color inks for the plurality of colors include a black ink, a cyan ink, a magenta ink and a yellow ink.

23. The ink jet recording ink set according to claim 21, wherein said light color inks contain said fine polymer particle in a quantity of from 0.5 to 10 wt % and said dark color inks contain said fine polymer particle in a quantity of from 0 to 5 wt %.

24. The ink jet recording ink set according to claim 21, wherein an average particle size of said fine polymer particle is between 50 and 250 nm.

25. The ink jet recording ink jet set according to claim 21, wherein surface tension of said dark color inks and said light color inks are between 28 and 40 mN/m.

26. The ink jet recording ink set according to claim 21, wherein said dark color inks and said light color inks also contain an acetylene glycol surfactant, and a quantity of said acetylene glycol surfactant contained is between 0.5 and 3 wt %.

27. The ink jet recording ink set according to claim 21, wherein said dark color inks and said light color inks further contain one or more penetrating agents selected from the group consisting of diethylene glycol mono-n-butyl ether, diethylene glycol mono-t-butyl ether, triethylene glycol mono-n-butyl ether, propylene glycol mono n butyl ether, dipropylene glycol mono-n-butyl ether, and a compound expressed by the following formula (I), and a quantity of said penetrating agents contained is between 1 and 20 wt %:

$$RO-(PO)_m-(EO)_n-H \qquad (I)$$

wherein R represents an alkyl group having 4 to 10 carbons, PO represents a propyleneoxy group, EO represents an ethyleneoxy group, m>1, n≧0, and m+n ≦20.

28. The ink jet recording ink set according to claim 21, wherein said pigment is self-dispersing pigment and/or dispersant dispersing pigment.

29. The ink jet recording ink set according to claim 28, wherein said self-dispersing pigment has in a surface thereof one or more functional groups selected from the group consisting of a carboxyl group, a carbonyl group, a hydroxyl group and a sulfonic acid group.

30. The ink jet recording ink set according to claim 21, wherein a total quantity of said pigment and said fine polymer particle contained in each of said dark color inks is between 5 and 15 wt % and a total quantity of said pigment and said fine polymer particle of each of said light color inks is between 5 and 15 wt %.

31. An ink jet recording method for forming a text and/or an image on an ordinary paper or a special ink jet recording paper comprising:
(a) providing the ink jet recording ink set according to claim 21,
(b) preferentially depositing said dark color inks of the plurality of colors on said ordinary paper; and
(c) preferentially depositing said light color inks of the plurality of colors on said special ink jet recording paper.

32. A recorded image obtained by the ink jet recording method according to claim 31.

33. An ink jet recording method for forming a text and/or an image on an ordinary paper or a special ink jet recording paper comprising:

(a) providing the ink jet recording ink set according to claim 21, and switching a recording mode by a setting of a driver mounted in an ink jet recording apparatus such that said dark color inks are preferentially deposited on said ordinary paper and said light color inks are preferentially deposited on said special ink jet recording paper.

34. An ink jet recording apparatus comprising (a) means for forming a text and/or images on an ordinary paper or a special ink jet recording paper, and (b) said ink jet recording ink set according to claim 21.

35. The ink jet recording ink set according to claim 21, wherein the water is present in each of the light color inks and in each of the dark color inks in an amount by wt % that is greater than an amount of any other component present in the respective light color inks and dark color inks.

36. The ink jet recording ink set according to claim 21, wherein the fine polymer particle is mixed into the ink in an emulsion form.

* * * * *

UNITED STATES PATENT AND TRADEMARK OFFICE
CERTIFICATE OF CORRECTION

PATENT NO. : 6,670,409 B2
DATED : December 30, 2003
INVENTOR(S) : Masahiro Yatake It is certified that error appears in the above-identified patent and that said Letters Patent is hereby corrected as shown below:

<u>Title page,</u>
Item [30], Foreign Application Priority Data, "April 15" should read -- April 18 --.

Signed and Sealed this

Eighteenth Day of May, 2004

JON W. DUDAS
*Acting Director of the United States Patent and Trademark Office*